(12) United States Patent  
Dear

(10) Patent No.: US 8,794,033 B2  
(45) Date of Patent: Aug. 5, 2014

(54) APPARATUSES FOR VACUUM INSULATING GLASS (VIG) UNIT TIP-OFF, AND/OR ASSOCIATED METHODS

(75) Inventor: Ryan L. Dear, Huntertown, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 406 days.

(21) Appl. No.: 13/326,876

(22) Filed: Dec. 15, 2011

(65) Prior Publication Data

US 2013/0153550 A1    Jun. 20, 2013

(51) Int. Cl.
*C03B 23/00*   (2006.01)
*B23K 26/20*   (2014.01)
*C03B 23/057*  (2006.01)

(52) U.S. Cl.
CPC ............ *C03B 23/006* (2013.01); *B23K 26/206* (2013.01); *C03B 23/0093* (2013.01); *C03B 23/057* (2013.01)
USPC ............... 65/34; 264/102; 264/482; 156/104; 156/109; 425/174.4; 219/121.65; 219/121.66

(58) Field of Classification Search
CPC  C03B 23/006; C03B 23/0093; C03B 23/057; B23K 26/206
USPC ............... 65/34, 108; 156/104, 109; 264/102, 264/482; 425/174, 174.4; 445/43; 219/121.65, 121.66
See application file for complete search history.

(56) References Cited

U.S. PATENT DOCUMENTS

| 4,683,154 | A | 7/1987 | Benson et al. |
| 5,657,607 | A | 8/1997 | Collins et al. |
| 5,664,395 | A | 9/1997 | Collins et al. |
| 5,902,652 | A | 5/1999 | Collins et al. |
| 6,692,600 | B2 | 2/2004 | Veerasamy et al. |
| 6,888,114 | B2 * | 5/2005 | Yagi ............................. 219/695 |
| 8,495,896 | B2 * | 7/2013 | Wu ................................ 65/509 |

FOREIGN PATENT DOCUMENTS

| DE | 10 2010 021 127 | 11/2011 |
| EP | 1 439 152 | 7/2004 |

OTHER PUBLICATIONS

International Search Report mailed Mar. 4, 2013.
U.S. Appl. No. 12/929,874, filed Feb. 22, 2011; Dennis.
U.S. Appl. No. 12/929,875, filed Feb. 22, 2011; Dennis.
U.S. Appl. No. 13/149,085, filed May 31, 2011; Miller et al.
U.S. Appl. No. 13/238,358, filed Sep. 21, 2011; Dennis.
U.S. Appl. No. 13/246,980, filed Sep. 28, 2011; Jones.

* cited by examiner

*Primary Examiner* — Samuel M Heinrich
(74) *Attorney, Agent, or Firm* — Nixon & Vanderhye P.C.

(57) ABSTRACT

Certain example embodiments of this invention relate to apparatuses for sealing the tips of pump-out tubes of vacuum insulating glass (VIG) units, and/or associated methods. In certain example embodiments, a laser source used in sealing the pump-out tube is thermally insulated from the VIG unit and emits a laser beam through one or more windows in an oven towards a mirror located therein. The mirror is located so as to redirect the laser beam onto the pump-out tube to thereby seal it. For instance, a substantially horizontal laser beam emitted from a laser source located outside the oven enters into the oven through one or more windows and is reflected by a mirror towards the pump-out tube to be sealed. The repositioning of the laser source advantageously can change its effective focal length and/or the location of the laser beam, e.g., because of the fixed location of the mirror.

24 Claims, 7 Drawing Sheets

APPARATUSES FOR VACUUM INSULATING GLASS (VIG) UNIT TIP-OFF, AND/OR ASSOCIATED METHODS

FIELD OF THE INVENTION

Certain example embodiments of this invention relate to apparatuses and/or methods used in making vacuum insulating glass (VIG) units. More particularly, certain example embodiments relate to apparatuses for sealing the tips of pump-out tubes, and/or associated methods. In certain example embodiments, a laser source used in sealing the pump-out tube is thermally insulated from the VIG unit and emits a laser beam through a window in an oven towards a mirror located therein, the mirror being located so as to redirect the laser beam onto the pump-out tube to thereby seal it.

BACKGROUND AND SUMMARY OF EXAMPLE EMBODIMENTS OF THE INVENTION

Vacuum IG units are known in the art. For example, see U.S. Pat. No. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump-out tube 8 is hermetically sealed by solder glass 9 to an aperture or hole 10 which passes from an interior surface of glass sheet 2 to the bottom of recess 11 in the exterior face of sheet 2. It is noted, however, that a recess is not necessary in certain example embodiments and, instead, in certain example embodiments, the hole may pass from the interior surface of the glass to the exterior surface of the glass. A vacuum is attached to pump-out tube 8, e.g., via a pump cup, so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. After formation of edge seal 4, a vacuum is drawn via the tube to form low pressure space 6.

The pressure in space 6 may be reduced by way of an evacuation process to a level below about $10^{-2}$ Torr, more preferably below about $10^{-3}$ Torr, and most preferably below about $5 \times 10^{-4}$ Torr. To maintain such low pressures below atmospheric pressure, substrates 2 and 3 are often hermetically sealed to one another by edge seal 4. The small, high strength support spacers 5 are provided between substrates 2, 3 in order to maintain separation of the approximately parallel substrates against atmospheric pressure. It is often desirable for spacers 5 to be sufficiently small so that they are visibly unobtrusive. Once the space between the substrates 2, 3 has been evacuated, the tube may be sealed, e.g., by melting.

The tube 8 oftentimes is located in the corner of one of the substrates, e.g., as shown in FIGS. 1-2. The tube 8 may be made of glass and protrude above the surface of the substrate in which it is located, e.g., to facilitate melting thereof in a sealing process. The process of melting a glass tube to a degree sufficient for the melted glass to seal the tube closed, while maintaining the vacuum within the VIG, is commonly referred to as tip-off. Lasers are sometimes used to seal the glass. One current solution involves the laser being positioned within a heated oven above the pump cup used in the evacuation. In some cases, the oven may be a multiple level oven in which multiple VIG subassemblies are processed in parallel. Provisions are made so that there is laser access to the various units in the multi-level oven. The temperature within the oven may reach as high as and sometimes even higher than 300 degrees C.

Most commonly used laser sources are orientated perpendicular to their targets. This is the case with current laser tip-off systems. Because VIG unit subassemblies typically are conveyed in a manner that is "face up" or substantially parallel to the ground, current laser tip-off systems orient their laser sources above the tube. A laser source in such a system emits its laser beam downward, through a quartz window, and onto the tube to melt it.

FIG. 3 is an example of a current multi-level laser tip-off system. As can be seen from FIG. 3, the VIG subassembly 1' rolls on rollers 17 or is conveyed on supports into and/or through the oven 21. Openings 23 are formed in the sidewall 25 and accommodate an insulated box 27 that houses the laser source 29. The insulated box 27 also typically is cooled to keep temperatures therein at a level sufficiently low so as to avoid damaging the laser source 29. The laser source 29 emits a laser beam 31 through a quartz window 33 formed in the insulated box 27. The laser beam 31 contacts and seals the pump-out tube.

Unfortunately, there are several drawbacks associated with the current approach shown in and described in connection with FIG. 3. The laser is enclosed in an insulated and cooled box to reduce the likelihood of damage to the laser source. This arrangement complicates the design and oftentimes plural individualized cooling subsystems. This arrangement also typically include access doors and/or panels that open to allow the laser to be inserted into the oven, removed when damaged, etc. Providing access to the laser, however, has been found to result in temperature uniformity issues within the body of the oven and on the surface VIG subassembly. To compensate for these non-uniformities, additional controls and heating capabilities are provided to reduce the non-uniformities. Another disadvantage relates to the space between subsequent levels, which is fairly large since each stage includes rollers, accommodates a VIG unit, and has an insulated and cooled box housing a laser. This increases vertical space requirements and/or restricts how many units can be stacked on top of one another.

Thus, it will be appreciated that there is a need in the art for improved techniques for sealing the pump-out tubes used in VIG units.

One aspect of certain example embodiments relates to enabling the laser source to be located outside of the oven by directing the laser beam through a sidewall of the oven to a laser mirror mounted above the pump cup and/or tube, with the mirror, in turn, reflecting the laser beam downward onto the tube (and possibly through a quartz or other window of the pump cup).

In certain example embodiments of this invention, a laser tip-off system for a vacuum insulating glass (VIG) unit is provided. An oven has an oven interior and a sidewall in which at least one opening is formed, with at least one window being located in the at least one opening. At least one reflector is located in the oven interior. At least one laser source is located outside of the oven, with the at least one laser source being aligned with the window and configured to emit a laser beam towards the at least one reflector. The at least one reflector is oriented within the oven interior to cause laser beams emitted from the at least one laser source to be redirected towards a pump-out tube of a VIG unit subassembly provided to the oven interior.

In certain example embodiments of this invention, a kit is provided. The kit comprises at least one vacuum insulating glass (VIG) unit subassembly including a glass pump-out tube to be sealed and a pump cup located over the pump-out tube; and a laser tip-off system for sealing the pump-out tube of the VIG unit subassembly. The system includes an oven having an oven interior and a wall in which at least one opening is formed, with at least one window being located in the at least one opening. At least one reflector is located in the oven interior. At least one laser source is located outside of the oven, with the at least one laser source being aligned with the window and configured to emit a laser beam towards the at least one reflector. The at least one reflector is oriented within the oven interior to cause laser beams emitted from the at least one laser source to be redirected towards the pump-out tube of the VIG unit subassembly when the VIG unit subassembly is provided to the oven interior.

In certain example embodiments of this invention, a method of making a vacuum insulating glass (VIG) unit is provided. There is provided an oven having an oven interior and a sidewall in which an opening is formed. A reflector is located in the oven interior and at least one window is located in the sidewall. A VIG unit subassembly is supplied to the oven, with the VIG unit subassembly having a pump-out tube to be sealed. A laser beam is emitted from a laser source located outside of the oven, with the laser beam being emitted through the at least one window and towards the reflector and being redirected by the reflector towards the pump-out tube to be sealed. The pump-out tube is melted using the laser beam in making the VIG unit.

In certain example embodiments of this invention, a method of making vacuum insulating glass (VIG) units is provided. There is provided an oven having an oven interior and a wall in which a plurality of openings are formed, with each opening corresponding to a different level of the oven and each level being suitable to accommodate a respective VIG unit subassembly. A laser-grade mirror is located in the oven interior at each said level, and at least one window is located in each said opening. VIG unit subassemblies are supplied to the oven at different respective levels thereof, with the VIG unit subassemblies each having a pump-out tube to be sealed. Laser beams are emitted from laser sources located outside of the oven, with each said laser beam being (a) emitted through an associated opening and any windows of the associated opening, (b) directed towards the mirror associated with that opening, and (c) redirected by the mirror towards the pump-out tube of the VIG unit subassembly at the corresponding level. The pump-out tubes are melted in making the VIG units.

In certain example embodiments, a laser tip-off system for a vacuum insulating glass (VIG) unit is provided. An oven has an oven interior and a sidewall in which at least one opening is formed, with at least one window being located in the at least one opening. At least one reflector is located in the oven interior. At least one laser source is located outside of the oven, with the at least one laser source being aligned with the window and configured to emit a laser beam towards the at least one reflector. The at least one reflector is oriented within the oven interior to cause laser beams emitted from the at least one laser source to be redirected towards a pump-out tube of a VIG unit subassembly provided to the oven interior. A vision system is configured to provide positional data for facilitating the melting of the pump-out tube. A lighting system is located remote from the oven. A quartz rod is configured to convey light from the lighting system to an area proximate the pump-out tube and through VIG unit so as to increase contrast in that area.

In certain example embodiments, a kit is provided. The kit includes at least one vacuum insulating glass (VIG) unit subassembly, with the VIG unit subassembly including a glass pump-out tube to be sealed and a pump cup located over the pump-out tube; and a laser tip-off system for sealing the pump-out tube of the VIG unit subassembly. The system comprises an oven having an oven interior and a wall in which at least one opening is formed, with at least one window being located in the at least one opening; at least one reflector located in the oven interior; at least one laser source located outside of the oven, with the at least one laser source being aligned with the window and configured to emit a laser beam towards the at least one reflector; an artificial vision system configured to (a) detect the placement of the VIG unit subassembly within the oven and (b) provide a signal to at least one processor of a control unit, with the signal being interpreted by the at least one processor to determine whether a vertical adjustment of the at least one laser source is to be made to adjust the area on which the laser beam is to be focused in dependence on the detected placement; and a quartz rod configured to convey light from a lighting system to an area proximate the pump-out tube and through VIG unit so as to increase contrast in that area. The at least one reflector is oriented within the oven interior to cause laser beams emitted from the at least one laser source to be redirected towards the pump-out tube of the VIG unit subassembly when the VIG unit subassembly is provided to the oven interior.

In certain example embodiments, a method of making a vacuum insulating glass (VIG) unit is provided. An oven having an oven interior and a sidewall in which an opening is formed is provided. A reflector is located in the oven interior and at least one window is located in the sidewall. A VIG unit subassembly is supplied to the oven, with the VIG unit subassembly having a pump-out tube to be sealed. The pump-out tube is located using a vision system and a contrast-enhancing backlight, with the contrast-enhancing backlight being originated from a light source located external to the oven and being conveyed to the oven interior via a quartz rod. A laser beam is emitted from a laser source located outside of the oven, with the laser beam being emitted through the at least one window and towards the reflector and being redirected by the reflector towards the pump-out tube to be sealed. The pump-out tube is melted using the laser beam in making the VIG unit.

In certain example embodiments, a method of making vacuum insulating glass (VIG) units is provided. An oven having an oven interior and a wall in which a plurality of openings are formed is provided, with each opening corresponding to a different level of the oven and each level being suitable to accommodate a respective VIG unit subassembly. A laser-grade mirror is located in the oven interior at each said level, and at least one window is located in each said opening. VIG unit subassemblies are supplied to the oven at different respective levels thereof, with the VIG unit subassemblies each having a pump-out tube to be sealed. At each level, the pump-out tube of the corresponding VIG unit subassembly is located, using a vision system and a contrast-enhancing backlight provided at that level, with the contrast-enhancing backlight being originated from a light source located external to the oven and being conveyed to the oven interior via a quartz rod. Laser beams from laser sources located outside of the oven are emitted, with each said laser beam being (a) emitted through an associated opening and any windows of the associated opening, (b) directed towards the mirror associated with that opening, and (c) redirected by the mirror towards the pump-out tube of the VIG unit subassembly at the corresponding level. The pump-out tubes are melted in making the VIG units.

In certain example embodiments, a laser tip-off system for a vacuum insulating glass (VIG) unit is provided. The system includes an oven; at least one laser source for melting a pump-out tube of the VIG unit; a vision system configured to provide positional data for facilitating the melting of the pump-out tube; a backlighting system located remote from the oven; and a quartz rod configured to convey light from the lighting system to an area proximate the pump-out tube and through VIG unit so as to increase contrast in that area and facilitate location of the pump-out tube by the vision system.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates and a frit. Also, while the frit may be said to be "on" or "supported" by one or more of the substrates herein, this does not mean that the frit must directly contact the substrate(s). In other words, the word "on" covers both directly and indirectly on, so that the frit may be considered "on" a substrate even if other material (e.g., a coating and/or thin film) is provided between the substrate and the frit.

In certain example embodiments, a laser source used in sealing the pump-out tube is located external to the oven through which a VIG unit subassembly is conveyed and therefore is thermally insulated from the VIG unit subassembly. The laser source of certain example embodiments emits a laser beam through a window in the oven towards a mirror located therein. The mirror is oriented so that it redirects the laser beam onto the pump-out tube to thereby seal it. By using a laser-rated mirror, the laser beam can be redirected to an orientation that is not perpendicular to the laser source itself. For example, the laser beam may be reoriented from a generally horizontal to a generally vertical orientation and thus towards to the tube it is to seal. Certain example embodiments advantageously enable the laser sources to remain outside of the oven during tip-off. Thus, the laser sources advantageously are not necessarily subjected to the heated environment of the oven. In certain example embodiments, complicated insulation and/or cooling systems can be avoided, although it may be desirable to provide, for instance, non-intrusive heat sinks or the like that conventionally are applied to laser sources.

Figure 4:
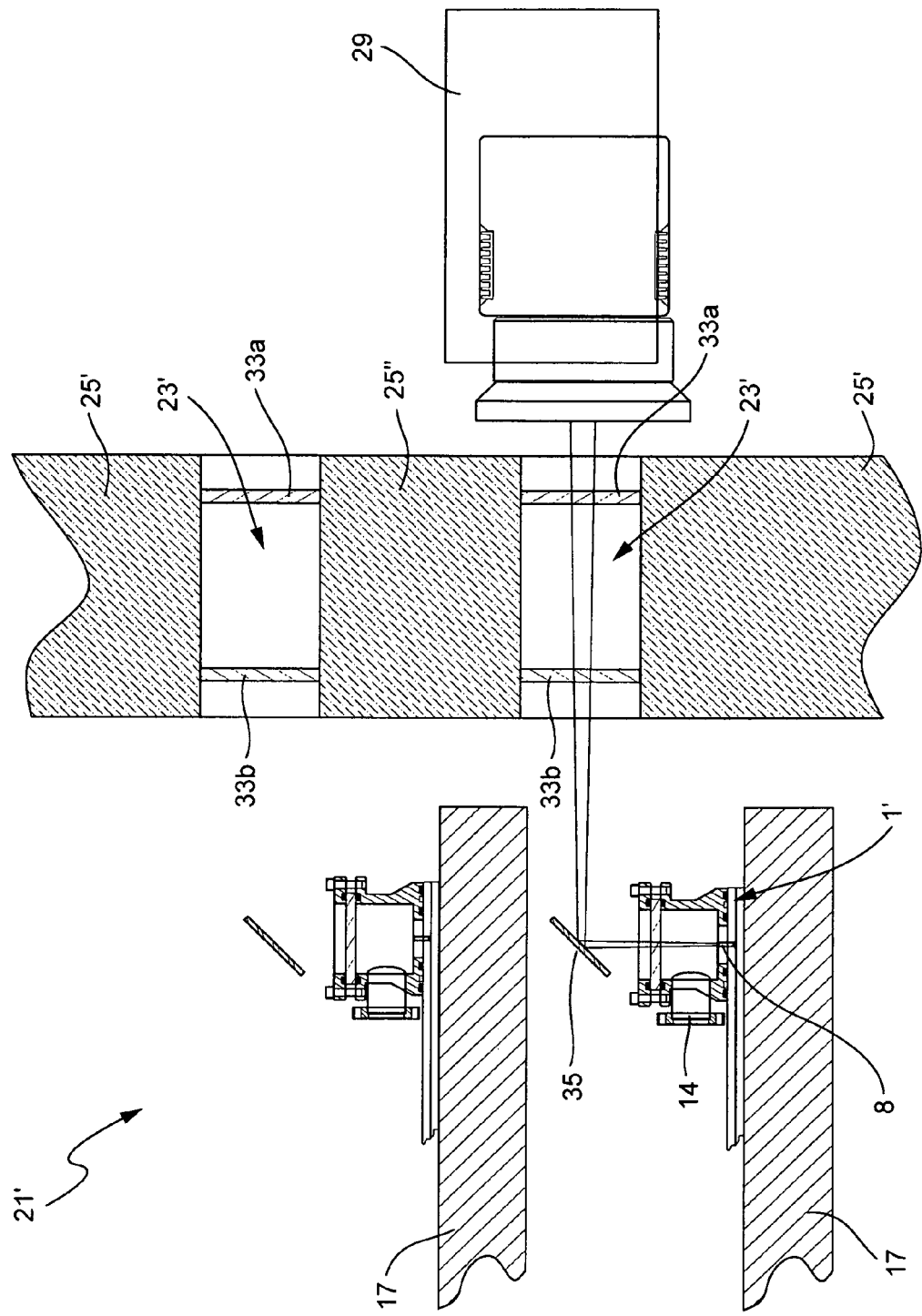
FIG. 4 is an illustrative multiple-level tip-off system in accordance with certain example embodiments.

Referring now more particularly to the drawings, FIG. 4 is an illustrative multiple-level tip-off system in accordance with certain example embodiments. As shown in FIG. 4, the laser source 29 is located outside of the main body portion of the oven 21'. A laser beam from the laser source 29 is directed through a window 23' formed in the sidewall 25' of the oven and through first and second quartz windows 33a and 33b. It is noted that a second laser source 29 has been omitted from FIG. 4 for ease clarity purposes, although certain example embodiments may of course use one laser source per oven. The laser beam contacts the laser mirror 35, which is located within the main body portion of the oven 21', and is then redirected downward towards the pump-out tube 8 of the VIG unit subassembly 1'. As shown in FIG. 4, the laser beam is redirected from its initial substantially horizontal direction into a substantially vertical direction, where it can pass through the pump cup 14 (or at least a window in the pump cup 14) and focus or otherwise be directed on to the pump-out tube 8 to help sea it. VIG subassemblies 1' may be conveyed through or at least into the improved oven 21' via rollers or the like 17, which may be glass, ceramic, Kevlar, or other types of rollers or the like. In certain example embodiments, a static support system may be utilized as an alternative to rollers to support the glass. Such a system may involve the glass being loaded and unloaded from the oven with a device.

Two example levels are shown in the FIG. 4 example embodiment. However, it will be appreciated that 1, 2, 3, or even more levels may be provided in different example embodiments. Furthermore, even though multiple levels may be provided, depending on the size of the operation, the amount of throughput desired, operating space or power limitations, etc., not all of the levels need to be actuated at one time. Preferably, the laser sources are individually actuatable, e.g., so that they may operate substantially independently from one another, thereby accommodating situations where differently sized and/or shaped VIG unit subassemblies are provided to the improved oven 21', as well as situations where not all of the laser sources need to be operational at a single time. When a laser source is not being operated, a door or gate may help close off the corresponding window portion 23' in the sidewall 25', thereby helping to maintain temperature uniformity within the oven 21'.

It is noted that the mirrors and/or laser sources may be fixed in position relative to the oven, and/or may move in one or two dimensions (e.g., along X- and Z-axes) in different example embodiments.

Although two windows are shown in the FIG. 4 example embodiment, it will be appreciated that more or fewer windows may be provided in different example embodiments. The number of mirrors may be balanced against factors including, for example, degree of thermal insulation desired, laser beam transmissivity and/or reflectivity, other effects on the laser beam, etc.

Although certain example embodiments refer to quartz windows, it will be appreciated that other materials may be used in place of, or together with, quartz. In general, any material that is substantially transparent to the wavelength emitted by the laser source may be used. Such a material preferably will allow at least about 75% of the energy through, more preferably at least about 90%, still more preferably at least about 95%, and sometimes even 95-99%. It is noted that an antireflective (AR) coating may be applied to one or both surfaces of one or more windows in a unit, e.g., to help increase transmission. It is noted that the laser power may be adjusted in dependence on the transmission, e.g., such that lower transmission generally involves higher laser power. It is noted that silica oftentimes is considered manufactured quartz but in a "more pure" form. In this regard, fused silica or the like may be used in lieu of quartz in certain example embodiments.

Preferably, laser sources outside of the oven will be exposed to a temperature no greater than 50 degrees C., more preferably no greater than 30 degrees C., and still more preferably no greater than 25 degrees C.

The mirrors of certain example embodiments may reflect a substantial portion of the laser beam impinging thereon. Reflection preferably will be at least about 80% of the energy coming into contact therewith, more preferably at least about 90%, and still more preferably at least 95-99%. Although certain example embodiments refer to mirrors, it will be appreciated that any suitable reflector may be used in different example embodiments of this invention.

It is noted that Edmond Optics supplies commercial laser optics and mirrors that may be suitable for use in connection with certain example embodiments, although other suppliers also make suitable products.

The example approach shown and described in connection with FIG. 4 may be advantageous for a number of reasons. For instance, subjecting an electronic system such as that involved in a laser source to elevated temperatures of up to 300 degrees C., for example, typically warrant special design considerations. Indeed, temperatures greater than 50 degrees C. can oftentimes cause problems for electronics and argue in favor of protection from the heat and/or active cooling systems. However, the reflected laser solution of certain example embodiments allows the laser source to remain outside of the heated environment of the oven, thus reducing the need for the laser source to be enclosed in an insulated and cooled box.

Figure 2:
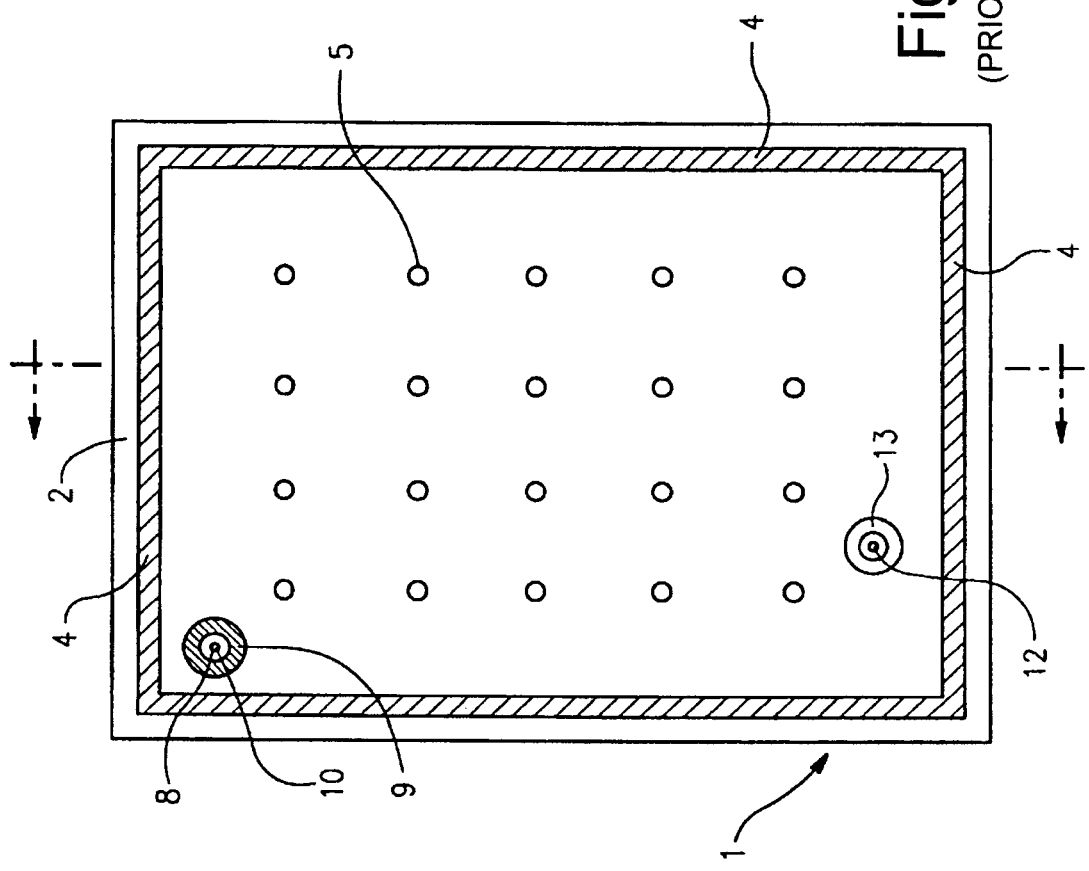
FIG. 2 is a prior art top plan view of the bottom substrate, edge seal, and spacers of the FIG. 1 vacuum IG unit taken along the section line illustrated in FIG. 1.
Figure 1:
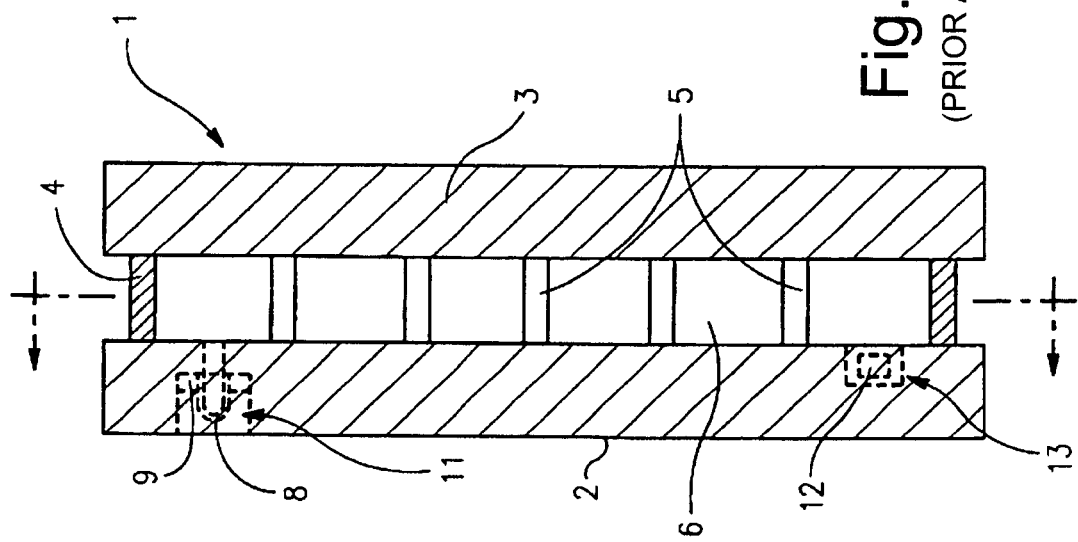
FIG. 1 is a prior art cross-sectional view of a conventional vacuum IG unit.
Figure 3:
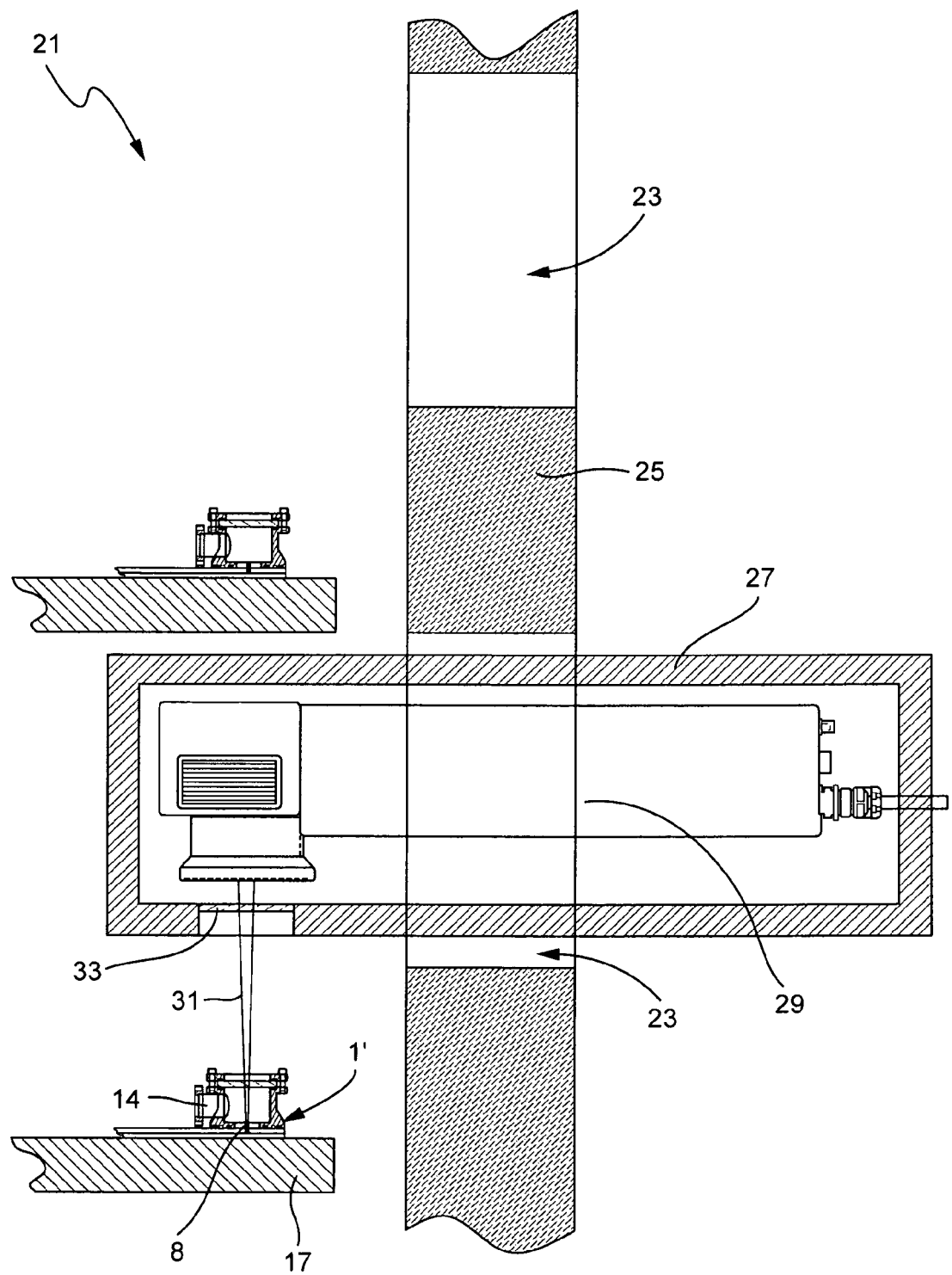
FIG. 3 is an example of a current multi-level laser tip-off system.

The current system shown in FIG. 3, for example, involves the laser and the attendant insulated box to enter into the oven through a relatively large access door in the sidewall of the oven. The access door(s) cause heat loss around the perimeter of the door. As indicated above, this heat loss may present temperature non-uniformities that may need to be overcome with additional heating facilities and respective controls system. When the laser is in position within the oven, the door is in the open position, and the laser is exposed to the ambient conditions. That area is caused to cool down because of the heat in the oven compared to the ambient environment. After the laser cycle is complete, the door may be closed and the oven may then need to reheat the cooled panel.

As described above, however, the reflected laser solution of certain example embodiments may be designed to include small access ports through the sidewall of the oven. However, as indicated above, one or more quartz or other windows may be incorporated into the system to help thermally insulate the laser source from the oven. A small secondary door may be added external to the outermost window in certain example embodiments, e.g., to help further insulate the port when a laser source is not present near that particular port. Similarly, in certain example embodiments, in addition or in the alternative, a shield wall portion may extend from an inner location to help seal the port when a laser source is not present.

Lasers generally are required to be positioned a set distance from the work surface, e.g., according to the focal length of the laser. Different lenses can be obtained to change the focal length of a laser, but these lenses typically have undesirable effects of other aspects of the laser process (e.g., in terms of wavelength, intensity, degree of collimation, beam shape, etc.). A vertically oriented laser beam conventionally requires that the laser be positioned vertically above the work surface, thereby making for a large vertical profile of the laser solution.

The vertical profile of the reflected laser solution of certain example embodiments can be greatly reduced compared to this approach, as much of the beam can travel in a substantially horizontal direction until it is reflected downward on to the tube. Reducing the vertical profile of the laser may also be used to reduce the distance between each level in a multi-level system. The size of the system as a whole, in turn, may be reduced and enabling a larger number of levels to be provided within a single oven. Because multiple elements can be located within a single oven, it is possible to reduce electrical consumption (e.g., in terms of a smaller space to heat and the reduction in active cooling associated with the lasers). The overall number of ovens therefore may be reduced.

A current system, for example, involves a vertical distance of 18 inches between the top surfaces of adjacent rollers. By contrast, certain example embodiments may reduce the vertical distance required by nearly one-third, e.g., by accommodating an example vertical distance between the top surfaces of adjacent rollers of about 6.25 inches. In an example configuration, and keeping sizes equal, 11 levels may be provided rather than only 3-4 using conventional approaches. Of course, other example embodiments may incorporate more or fewer levels.

Current systems also may incorporate two axes of motion, e.g., substantially vertical and substantially horizontal axes of motion. This may be desirable to account for different focal lengths of the laser and for differently sized VIG units. By contrast, certain example embodiments may incorporate one-axis motions in the substantially vertical direction. Horizontally adjusting the laser while keeping the mirror location constant may change the focus and/or the area with which the reflected laser beam contacts, thereby accommodating VIG units of different thicknesses. It is noted that moving the laser source horizontally moves the focal length of the laser, while moving the laser source vertically changes the reflected viewable area in a single axis. In certain example embodiments, two-axis movement may be provided. In certain example embodiments, the mirrors may be repositionable within the system, e.g., manually or via a possibly computer-controlled mechanical movement system in communication therewith.

It is noted that vision systems may be incorporated into the system, e.g., to aid in aligning the laser beam with the VIG unit. For example, a vision system may locate the pump-out tube and move the laser beam to account for differently positioned VIG units. In other cases, the vision system may stop the laser source from emitting the laser if there is no VIG unit detected, if there is no or only a small chance of hitting the desired target, etc. Lighting may be provided within the unit for, human and/or computer vision needs, and/or the like. The galvometers of current systems may be maintained in connection with certain example embodiments, e.g., for scanning and/or other purposes.

Figure 5:
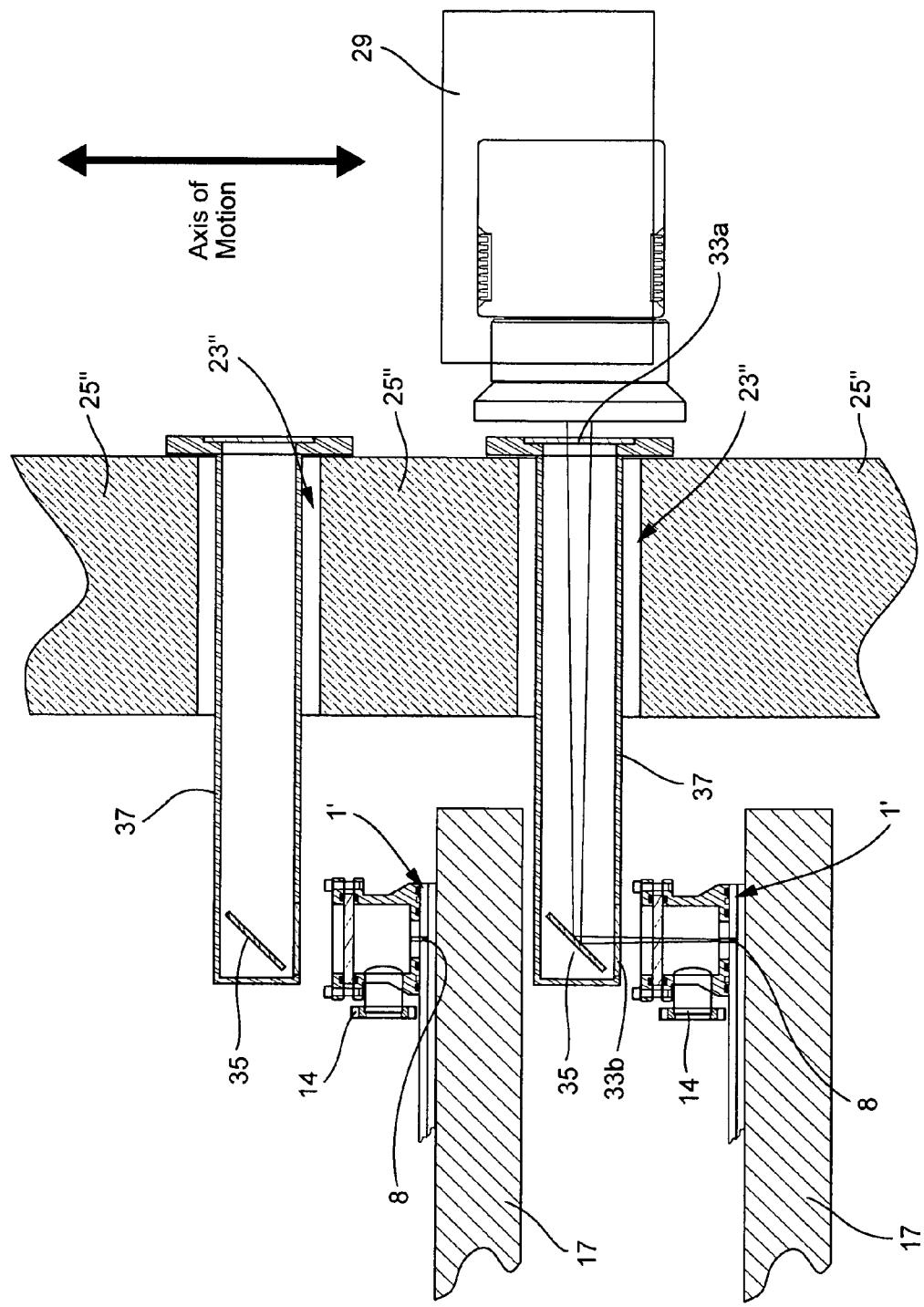
FIG. 5 is another illustrative multiple-level tip-off system in accordance with certain example embodiments.

FIG. 5 is another illustrative multiple-level tip-off system in accordance with certain example embodiments. The FIG. 5 example embodiment is very similar to the FIG. 4 example embodiment. However, the FIG. 5 example embodiment provides a housing 37 in which the laser mirror 35 is housed and that supports the first and second windows 33a and 33b. As shown in the FIG. 5 example embodiment, the housing 37 may be removably mounted to the unit. The body of the housing 37 may include an insulating material in certain example instances. In certain example embodiments, the housing 37 may include arms that facilitate the connection to the body of the sidewall 25" and also provide further insulation with respect to the ambient environment. The housing 37 advantageously may help protect the laser mirror 35 located therein, e.g., from heat, debris, etc., and the housing 37 itself may be removed as one assembly, e.g., to replace the mirror 35, quartz windows, etc. A first quartz window 33a may be integrated into an outer edge of the housing 37 proximate to the laser source 29 similar to as shown in the FIG. 4 example embodiment. However, the second quartz window 33b may not be in line with the first quartz window 33a. Instead, the laser beam from the laser source 29 may be directed through the first quartz window 33a and towards the mirror 35. The second quartz window 33b may be substantially perpendicular to the first quartz window 33a, e.g., such that the laser beam passes through it after redirection by means of the mirror 35. It will be appreciated that further quartz windows may be provided within the body of the housing, possibly substantially in line with the first quartz window 33a, e.g., for insulating purposes. In certain example embodiments, the housing (or modular detail) may be attached to the laser and moved with the laser to different levels. The example modifications discussed above (e.g., in connection with the FIG. 4 example embodiment) also may be applied in connection with the FIG. 5 example embodiment to achieve yet further embodiments.

It is noted that one or more housings (e.g., shown as element 37 in FIG. 5) may be mounted to the laser gantry system and relocated to the different levels of the oven. This flexible approach may be advantageous, e.g., from cost and maintenance perspectives in certain example scenarios. For instance, a single relocatable housing/mirror assembly may provide cost advantages over an embodiment with two or more statically mounted assemblies. Certain example embodiments may involve 12 discrete levels, and a single relocatable housing may provide cost and maintenance savings over an embodiment that includes 12 different static housing and/or mirror assemblies.

Figure 6:
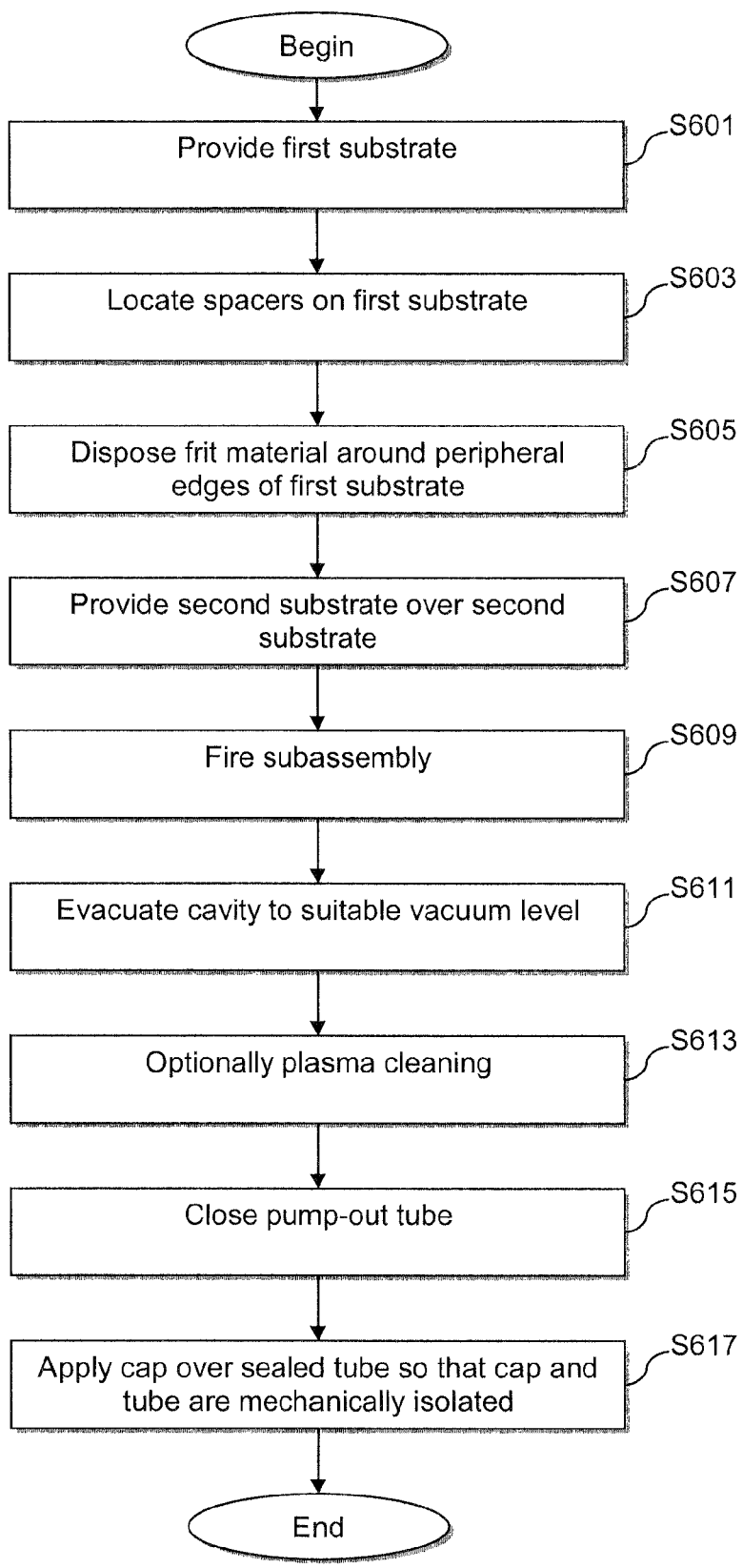
FIG. 6 is a flowchart showing an illustrative process for making a VIG unit in accordance with certain example embodiments.

FIG. 6 is a flowchart showing an illustrative process for making a VIG unit in accordance with certain example embodiments. A first substrate is provided in step S601. Spacers or pillars are located on a first major surface of the first substrate in step S603. In step S605, frit material is disposed (e.g., printed or otherwise applied) around peripheral edges of the first substrate. In step S607, the second substrate is provided over the second substrate, sandwiching the pillars or spacers and defining a cavity therebetween. The subassembly is fired in step S609, e.g., to form hermetic edge seals. The cavity is evacuated to a suitable vacuum level in step S611, e.g., using a pump-out tube disposed in a pump-out port of the first or second substrate, in the edge seal, or elsewhere. Plasma cleaning (e.g., of the space between the first and second substrates) optionally may be performed in step S613. See, for example, U.S. application Ser. No. 13/149,085, filed on May 31, 2011, and U.S. Pat. No. 6,692,600, the entire contents of each of which are hereby incorporated herein by reference.

In step S615, the pump-out tube is closed. This may be accomplished in certain example embodiments by melting a tube, e.g., by focusing a laser beam on it or by exposing to some other form of heat and/or energy, in accordance with the techniques disclosed herein. In step S617, a cap may be disposed over the sealed tube so that a cavity of the cap axially accommodates a protruding portion of the tube. The cap preferably is connected to the outer surface of the substrate or area where the tube is located so that the cap and the tube are mechanically isolated from one another. This bonding may be accomplished using an adhesive (which may in certain example embodiments be a double-sided tape or other adhesive) that is interposed between a flat bottom surface of the cap and the substrate's surface. The adhesive material preferably will be projected to last the lifetime of the VIG unit, may be resistant to UV, water, etc., and may form a high-quality seal between the cap and the substrate. Example pump-out tube protecting techniques are disclosed in, for example, U.S. application Ser. No. 13/246,980, filed on Sep. 28, 2011, the entire contents of which are hereby incorporated herein by reference.

Edge seal 4 may be made of any suitable material, including but not limited to solder glass in different embodiments of this invention. In certain embodiments, edge seal 4 may be cured using microwave energy, infrared radiation, or any other suitable heat source. In certain example embodiments, the frit material used to seal the edges of the VIG unit may be, for example, one of the frit materials disclosed in application Ser. No. 12/929,875, filed Feb. 22, 2011; and/or application Ser. No. 13/238,358, filed Sep. 21, 2011, the entire contents of each of which are incorporated herein by reference. Other frit materials may be used including, for example, Ferro 2824B and 2824G frits. See, for example, application Ser. No. 12/929,874, filed Feb. 22, 2011, the entire contents of which are incorporated herein by reference. Other so-called "lead-free" frits may be used in different embodiments.

Sealing temperatures may be less or equal to about 500 degrees C. in certain example embodiments. Preferably, sealing temperatures may be kept still lower, e.g., less than or equal to about 450 degrees C., more preferably less than or equal to about 400 degrees C., and sometimes less than or equal to around 375 degrees C. An example frit sealing temperature used in connection with the frits listed above is about 380 degrees C.

In certain embodiments, each spacer 5 may have a height of from about 0.1 to 1.0 mm, more preferably from about 0.2 to 0.4 mm. Spacers 5 may be made of solder glass, glass, ceramic, metal, polymer, or any other suitable material in different embodiments of this invention. Spacers 5 may be cylindrical in shape, round in shape, spherical in shape, dime-shaped, C-shaped, pillow-shaped, or any other suitable shape in different embodiments of this invention.

In certain embodiments of this invention, substrates 2 and 3 may be approximately the same size. However, in other embodiments, one glass substrate 2 may be larger in size than the other glass substrate 3 in order to provide an approximately L-shaped step proximate an edge of the vacuum IG unit.

It will be appreciated that the example embodiments described herein may be used in connection with a variety of different VIG assembly and/or other units or components. For example, the substrates may be glass substrates, heat strengthened substrates, tempered substrates, laminated articles (e.g., two or more sheets of glass or other materials connected with a polymer-based interlayer such as, for example, PVB, EVA, or the like), etc.

Certain example embodiments relate to techniques for illuminating the pump-out tube so as to facilitate its melting. More particularly, in certain example embodiments, the pump-out tube is illuminated through the optics of the laser on the production equipment. The light may follow the same path as the laser beam, e.g., through one or more quartz windows and towards a mirror within the oven's interior, and then in a different (e.g., downward) direction towards the pump-out tube. This lighting technique may help the vision system locate the tube to be melted. The vision system may provide positional offsets to the laser source or a controller thereof to help ensure that the laser beam is aligned with the top of the tube.

The pump-out tube may be backlit to help obtain an image that may be used help the vision system locate it. For example, backlighting (e.g., from below) the tube may provide increased contrast for the defining features of the tube to help allow it to be identified by the vision system. Unfortunately, however, the heat within the oven causes problems for this type of illumination, e.g., as it is somewhat difficult to find a suitable high temperature light. While it might be possible to employ a fiber optic system that would allow the light to remain outside the oven with the fiber routed to the interior, there still is a practical limit on the temperature range, as well as the size of the fiber. For instance, it has been found that a 0.75" diameter backlit circle is advantageous for lighting and vision purposes. As indicated above, the oven temperatures can reach 300 degrees C. or even higher.

Certain example embodiments address these issues by cutting a section of solid quartz rod and positioning one end in front of an LED light. The quartz rod may "transport illumination" to a desired location, and good light transmission through the tube has been found to be possible using such an example arrangement. The rod may in certain example embodiments be bent, e.g., so as to help reduce space requirements and provide for alternate positioning of the light source. A quartz rod with a 90 degree bend was tested and found to provide good light transmission, even through there was a large bend in the rod. In general, it has been discovered that quartz is a good material choice because of its good light transmission and very low thermal stress properties. These properties are advantageous because certain example embodiments may involve a substantial portion (and possibly the majority of) the rod being at oven temperature, with the end outside of the oven being at or near ambient conditions.

Figure 7:
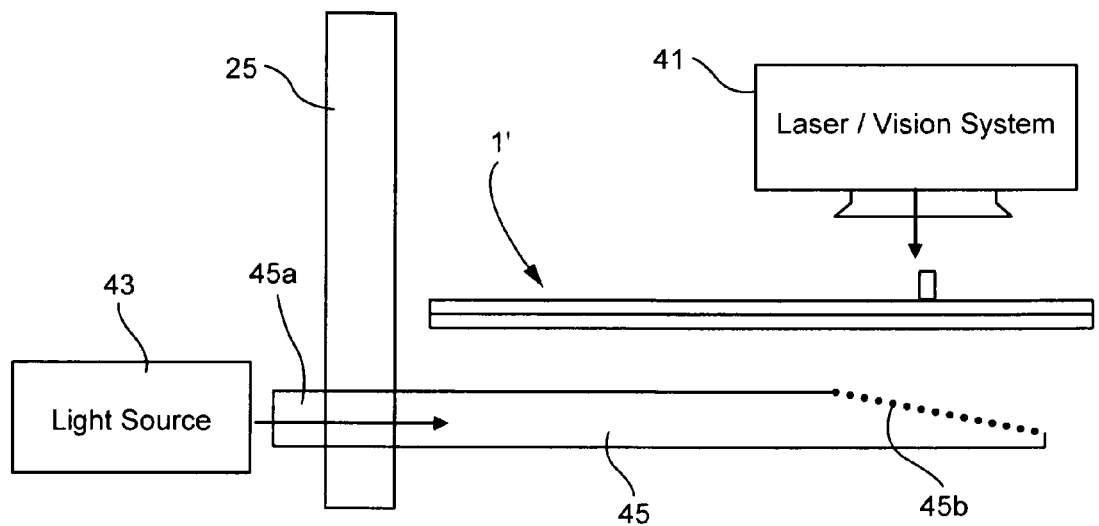
FIG. 7 is a schematic view of an example lighting system that incorporates a straight length of quartz rod with a 90 degree opaque face on the light source end and a 30 degree opaque face on the opposite end.

FIG. 7 is a schematic view of an example lighting system that incorporates a straight length of quartz rod with a 90 degree opaque face on the light source end and a 30 degree opaque face on the opposite end. The laser/vision system 41 directs a laser and light downwardly onto the VIG unit subassembly 1 and towards the pump-out tube. To help increase contrast, light from a light source 43 is passed through a quartz rod 45. In particular, the quartz rod 45 includes a first face 45a proximate to the light source 43, and a second angled face 45b proximate to where the contrast is to be added. As can be seen in FIG. 7, a substantial portion of the rod 45 is located in the oven and thus subjected to its high temperature inner environment, and the rod 45 itself passes through the sidewall 25.

Figure 8:
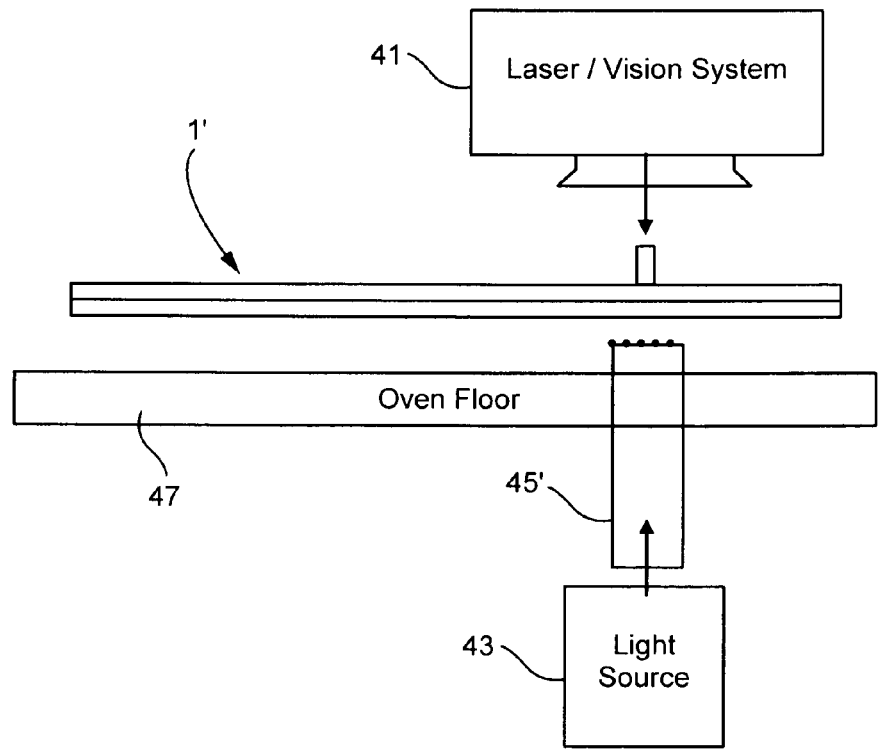
FIG. 8 is a schematic view of an example lighting system that incorporates a straight length of quartz rod, with the end thereof being positioned perpendicular to the glass plane.

FIG. 8 is a schematic view of an example lighting system that incorporates a straight length of quartz rod, with the end thereof being positioned perpendicular to the glass plane. The FIG. 8 example is similar to the FIG. 7 example, except that the quartz rod 45' passes through the oven floor 47 and includes two perpendicular faces. This approach has been found to provide better light intensity as compared to the FIG. 7 approach.

This approach requires that the floor of the oven be accessible to port the quartz rod from below. This may be acceptable in a one-level oven. However, the floor may be inaccessible in certain arrangements, e.g., where a multiple level oven is used, therefore making it difficult to locate the light source and quartz rod to be located within the oven above the first level. This may pose challenges in terms of increasing the distance between levels, subjecting the light source to temperatures far beyond what it is rated, etc.

Figure 9:
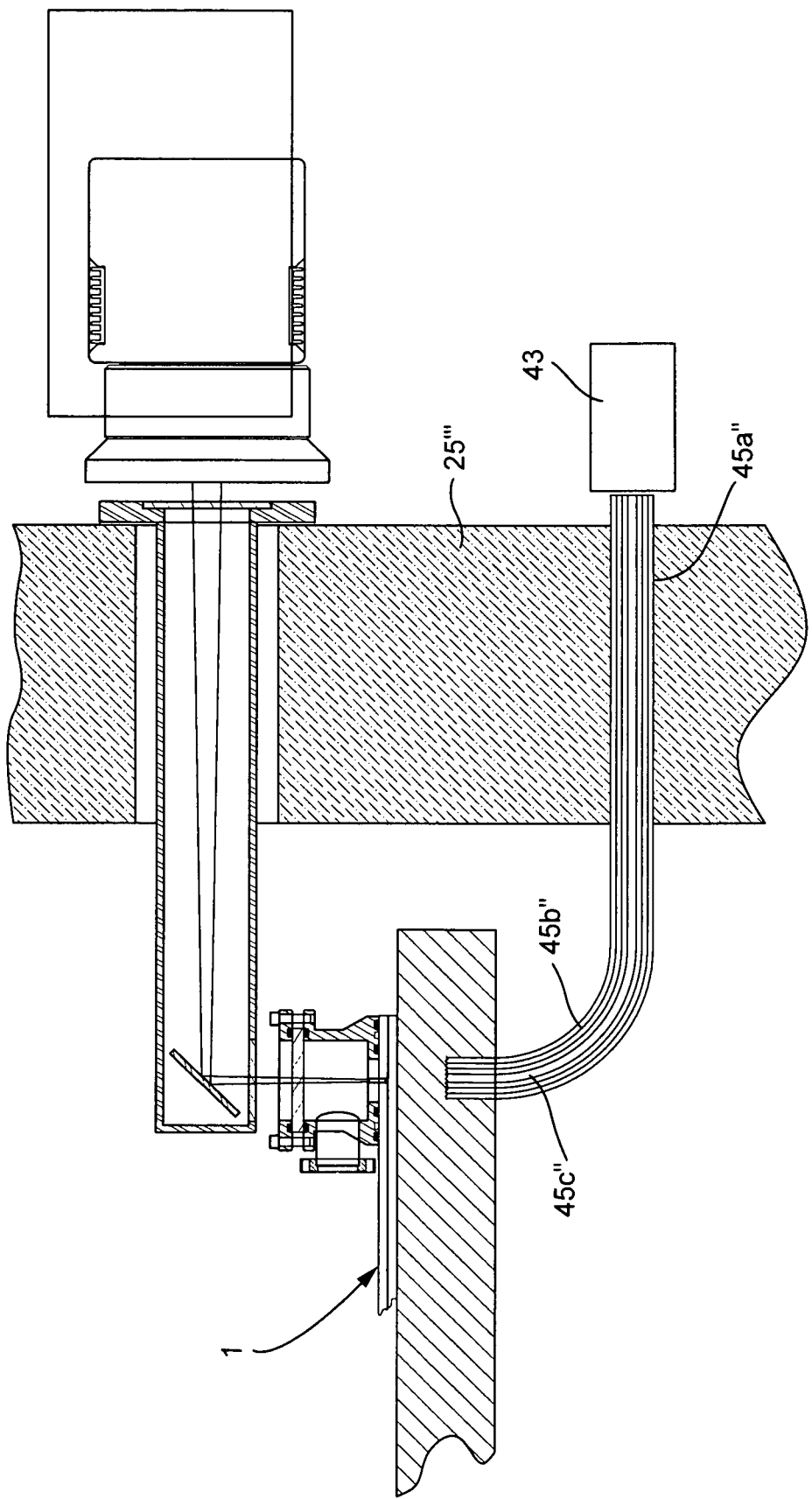
FIG. 9 is a schematic view of an example lighting system that incorporates a bent quartz rod in accordance with certain example embodiments.

FIG. 9 is a schematic view of an example lighting system that incorporates a bent quartz rod in accordance with certain example embodiments. That is, in certain example embodiments, length of solid fused quartz rod with a bend near one end may be used to provide the end of the rod close to perpendicular to the glass plane, thereby providing improved backlighting capabilities. The illumination source may then remain outside of the sidewall of the oven, with the light being "transported" to the opposite end of the rod located under the pump down tube. Most of the rod may be at oven process temperature, with the lighting source end remaining at or near ambient. Both ends of the rod may be made opaque to improve the light dispersion in a uniform manner. In certain example embodiments, the quartz rod may be compound bent so as to help reduce mechanical interferences while still providing illumination capabilities.

It will be appreciated that the FIG. 9 example embodiment is based on the FIG. 5 example embodiment described above. FIG. 9 includes a bent quartz rod that includes various portions including, for example, a first portion 45a" proximate to the light source 43 (which may be an LED light source in certain example embodiments), one or more bent portions 45b", and a third portion 45c", which is proximate to the VIG unit subassembly 1 and the pump-out tube to be sealed. The quartz rod is routed through a separate opening in the sidewall 25'''.

In certain example embodiments, the top lighting of the tube advantageously may be complimented so as to impart further contrast that, in turn, may facilitate part recognition. Furthermore, in certain example embodiments, the remote lighting sources may be able to provide backlighting whereas commercially available backlighting solutions including common remote fiber optic options generally are not available to withstand the high temperatures within the oven.

In certain example embodiments, a laser tip-off system for a vacuum insulating glass (VIG) unit is provided. An oven has an oven interior and a sidewall in which at least one opening is formed, with at least one window being located in the at least one opening. At least one reflector is located in the oven interior. At least one laser source is located outside of the oven, with the at least one laser source being aligned with the window and configured to emit a laser beam towards the at least one reflector. The at least one reflector is oriented within the oven interior to cause laser beams emitted from the at least one laser source to be redirected towards a pump-out tube of a VIG unit subassembly provided to the oven interior.

In certain example embodiments, a kit is provided. The kit comprises at least one vacuum insulating glass (VIG) unit subassembly including a glass pump-out tube to be sealed and a pump cup located over the pump-out tube; and a laser tip-off system for sealing the pump-out tube of the VIG unit subassembly. The system includes an oven having an oven interior and a wall in which at least one opening is formed, with at least one window being located in the at least one opening. At least one reflector is located in the oven interior. At least one laser source is located outside of the oven, with the at least one laser source being aligned with the window and configured to emit a laser beam towards the at least one reflector. The at least one reflector is oriented within the oven interior to cause laser beams emitted from the at least one laser source to be redirected towards the pump-out tube of the VIG unit subassembly when the VIG unit subassembly is provided to the oven interior.

In addition to the features of either of the previous two paragraphs, in certain example embodiments, the or each said opening may include at least first and second windows.

In addition to the features of any of the previous three paragraphs, in certain example embodiments, each said window may be made of quartz.

In addition to the features of any of the previous four paragraphs, in certain example embodiments, a series of rollers may be located in the oven, with the rollers being suitable for conveying the VIG unit subassembly through the oven.

In addition to the features of any of the previous five paragraphs, in certain example embodiments, the at least one laser source may be repositioned horizontally and/or vertically to adjust an area on which laser beams emitted therefrom is focused.

In addition to the features of the previous paragraph, in certain example embodiments, an artificial vision system may be configured to (a) detect the placement of the VIG unit subassembly within the oven and (b) provide a signal to at least one processor of a control unit, the signal being interpreted by the at least one processor to determine whether a vertical adjustment of the at least one laser source is to be made to adjust the area on which the laser beam is to be focused in dependence on the detected placement.

In addition to the features of any of the previous seven paragraphs, in certain example embodiments, the sidewall of the oven may include a plurality of openings, with each said opening including at least one window located therein, and with the openings being spaced apart from one another; a plurality of reflectors may be located in the oven interior, with each said reflector being aligned with a corresponding opening and window; and a plurality of laser sources may be locatable outside of each said window, with each said laser source being configured to emit a laser beam at a corresponding reflector, and with the corresponding reflector being oriented to redirected the corresponding laser beam that comes into contact therewith towards a pump-out tube of a VIG unit subassembly provided to the oven interior at a corresponding level thereof.

In addition to the features of the previous paragraph, in certain example embodiments, the laser sources may be individually actuatable.

In addition to the features of either of the previous two paragraphs, in certain example embodiments, a plurality of doors may be located in the sidewall, with each said door being provided to close off a corresponding opening in the sidewall.

In addition to the features of any of the previous ten paragraphs, in certain example embodiments, there may be provided a housing in which the at least one reflector is located, with the housing extending through the at least one opening in the sidewall and into the interior of the oven, and with the housing supporting a first window aligned with the at least one laser source and a second window that is substantially perpendicular to the first window.

In certain example embodiments, a method of making a vacuum insulating glass (VIG) unit is provided. There is provided an oven having an oven interior and a sidewall in which an opening is formed. A reflector is located in the oven interior and at least one window is located in the sidewall. A VIG unit subassembly is supplied to the oven, with the VIG unit subassembly having a pump-out tube to be sealed. A laser beam is emitted from a laser source located outside of the oven, with the laser beam being emitted through the at least one window and towards the reflector and being redirected by the reflector towards the pump-out tube to be sealed. The pump-out tube is melted using the laser beam in making the VIG unit.

In addition to the features of the previous paragraph, in certain example embodiments, the opening may include at least first and second quartz windows.

In addition to the features of the either of the two previous paragraphs, in certain example embodiments, the oven may include a plurality of rollers configured to convey the VIG unit subassembly therethrough.

In addition to the features of any of the three previous paragraphs, in certain example embodiments, the laser source may be repositioned to adjust an area on which the laser beam is focused.

In addition to the features of any of the four previous paragraphs, in certain example embodiments, the placement of the VIG unit subassembly within the oven may be detected, via a vision system; and a position of the laser source may be adjusted based on the detected placement of the VIG unit subassembly to cause a corresponding adjustment in an area on which the laser beam is focused.

In addition to the features of any of the five previous paragraphs, in certain example embodiments, a housing in which the at least one reflector is located may be connected to the oven, with the housing extending through the opening in the sidewall and into the interior of the oven, with the housing supporting a first window aligned with the laser source and a second window that is substantially perpendicular to the first window, and with the laser beam being emitted through the first window, redirected by the reflector, and through second window in that order.

In certain example embodiments, a method of making vacuum insulating glass (VIG) units is provided. There is provided an oven having an oven interior and a wall in which a plurality of openings are formed, with each opening corresponding to a different level of the oven and each level being suitable to accommodate a respective VIG unit subassembly. A laser-grade mirror is located in the oven interior at each said level, and at least one window is located in each said opening. VIG unit subassemblies are supplied to the oven at different respective levels thereof, with the VIG unit subassemblies each having a pump-out tube to be sealed. Laser beams are emitted from laser sources located outside of the oven, with each said laser beam being (a) emitted through an associated opening and any windows of the associated opening, (b) directed towards the mirror associated with that opening, and (c) redirected by the mirror towards the pump-out tube of the VIG unit subassembly at the corresponding level. The pump-out tubes are melted in making the VIG units.

In addition to the features of the previous paragraph, in certain example embodiments, the laser sources may be individually actuatable.

In addition to the features of the previous paragraph, in certain example embodiments, doors located in the wall of the oven may be openable and closable to open and close associated openings in the wall when laser sources are and are not being used therethrough, respectively.

In addition to the features of any of the three previous paragraphs, in certain example embodiments, the oven interior may be heatable to a temperature of about 500 degrees C., while the laser sources remain at temperatures at or near ambient.

In addition to the features of any of the four previous paragraphs, in certain example embodiments, the oven interior may be heatable to a temperature of about 300 degrees C., while the laser sources remain at temperatures at or below 50 degrees C.

In addition to the features of any of the five previous paragraphs, in certain example embodiments, each said level may support a housing in which a corresponding mirror is located, with each said housing extending through the corresponding opening in the sidewall and into the interior of the oven, with each said housing supporting a first window aligned with the corresponding laser source and a second window that is substantially perpendicular to the first window, and with the laser beam being emitted through the first window, redirected by the reflector, and through second window in that order.

In certain example embodiments, a laser tip-off system for a vacuum insulating glass (VIG) unit is provided. An oven has an oven interior and a sidewall in which at least one opening is formed, with at least one window being located in the at least one opening. At least one reflector is located in the oven interior. At least one laser source is located outside of the oven, with the at least one laser source being aligned with the window and configured to emit a laser beam towards the at least one reflector. The at least one reflector is oriented within the oven interior to cause laser beams emitted from the at least one laser source to be redirected towards a pump-out tube of a VIG unit subassembly provided to the oven interior. A vision system is configured to provide positional data for facilitating the melting of the pump-out tube. A lighting system is located remote from the oven. A quartz rod is configured to convey light from the lighting system to an area proximate the pump-out tube and through VIG unit so as to increase contrast in that area.

In addition to the features of the previous paragraph, in certain example embodiments, the lighting system may include at least one LED light source.

In addition to the features of the either of the two previous paragraphs, in certain example embodiments, the quartz rod may be opaque at ends thereof.

In addition to the features of any of the three previous paragraphs, in certain example embodiments, the quartz rod may include at least one bend.

In addition to the features of the previous paragraph, in certain example embodiments, the at least one bend may be located within the oven.

In addition to the features of any of the five previous paragraphs, in certain example embodiments, a majority of the quartz rod may be located within the oven interior.

In addition to the features of any of the six previous paragraphs, in certain example embodiments, the or each said opening may include at least first and second windows.

In addition to the features of any of the seven previous paragraphs, in certain example embodiments, the at least one reflector may be located in a housing, with the housing extending through the at least one opening in the sidewall and into the interior of the oven, and with the housing supporting a first window aligned with the at least one laser source and a second window that is substantially perpendicular to the first window.

In addition to the features of any of the eight previous paragraphs, in certain example embodiments, the sidewall of the oven may include a plurality of openings, with each said opening including at least one window located therein, and with the openings being spaced apart from one another. A plurality of reflectors may be located in the oven interior, with each said reflector being aligned with a corresponding opening and window. A plurality of laser sources may be locatable outside of each said window, with each said laser source being configured to emit a laser beam at a corresponding reflector, and with the corresponding reflector being oriented to redirected the corresponding laser beam that comes into contact therewith towards a pump-out tube of a VIG unit subassembly provided to the oven interior at a corresponding level thereof. A quartz rod may be provided for each said opening.

In certain example embodiments, a kit is provided. The kit includes at least one vacuum insulating glass (VIG) unit subassembly, with the VIG unit subassembly including a glass pump-out tube to be sealed and a pump cup located over the pump-out tube, and a laser tip-off system for sealing the pump-out tube of the VIG unit subassembly. The system comprises an oven having an oven interior and a wall in which at least one opening is formed, with at least one window being located in the at least one opening; at least one reflector located in the oven interior; at least one laser source located outside of the oven, with the at least one laser source being aligned with the window and configured to emit a laser beam towards the at least one reflector; an artificial vision system configured to (a) detect the placement of the VIG unit subassembly within the oven and (b) provide a signal to at least one processor of a control unit, with the signal being interpreted by the at least one processor to determine whether a vertical adjustment of the at least one laser source is to be made to adjust the area on which the laser beam is to be focused in dependence on the detected placement; and a quartz rod configured to convey light from a lighting system to an area proximate the pump-out tube and through VIG unit so as to increase contrast in that area. The at least one reflector is oriented within the oven interior to cause laser beams emitted from the at least one laser source to be redirected towards the pump-out tube of the VIG unit subassembly when the VIG unit subassembly is provided to the oven interior.

In addition to the features of the previous paragraph, in certain example embodiments, the quartz rod may include at least one bend.

In addition to the features of the either of the two previous paragraphs, in certain example embodiments, the laser tip-off system may further comprise a housing in which the at least one reflector is located, with the housing extending through the at least one opening in the sidewall and into the interior of the oven, and with the housing supporting a first window aligned with the at least one laser source and a second window that is substantially perpendicular to the first window.

In certain example embodiments, a method of making a vacuum insulating glass (VIG) unit is provided. An oven having an oven interior and a sidewall in which an opening is formed is provided. A reflector is located in the oven interior and at least one window is located in the sidewall. A VIG unit subassembly is supplied to the oven, with the VIG unit subassembly having a pump-out tube to be sealed. The pump-out tube is located using a vision system and a contrast-enhancing backlight, with the contrast-enhancing backlight being originated from a light source located external to the oven and being conveyed to the oven interior via a quartz rod. A laser beam is emitted from a laser source located outside of the oven, with the laser beam being emitted through the at least one window and towards the reflector and being redirected by the reflector towards the pump-out tube to be sealed. The pump-out tube is melted using the laser beam in making the VIG unit.

In addition to the features of the previous paragraph, in certain example embodiments, the opening may include at least first and second quartz windows.

In addition to the features of the either of the two previous paragraphs, in certain example embodiments, a position of the laser source may be adjusted based on a control signal received from the vision system.

In addition to the features of any of the three previous paragraphs, in certain example embodiments, the lighting system may include at least one LED light source.

In addition to the features of any of the four previous paragraphs, in certain example embodiments, the quartz rod may be opaque at ends thereof.

In addition to the features of any of the five previous paragraphs, in certain example embodiments, the quartz rod includes at least one bend.

In addition to the features of the previous paragraph, in certain example embodiments, the at least one bend may be located within the oven.

In certain example embodiments, a method of making vacuum insulating glass (VIG) units is provided. An oven having an oven interior and a wall in which a plurality of openings are formed is provided, with each opening corresponding to a different level of the oven and each level being suitable to accommodate a respective VIG unit subassembly. A laser-grade mirror is located in the oven interior at each said level, and at least one window is located in each said opening. VIG unit subassemblies are supplied to the oven at different respective levels thereof, with the VIG unit subassemblies each having a pump-out tube to be sealed. At each level, the pump-out tube of the corresponding VIG unit subassembly is located, using a vision system and a contrast-enhancing backlight provided at that level, with the contrast-enhancing backlight being originated from a light source located external to the oven and being conveyed to the oven interior via a quartz rod. Laser beams from laser sources located outside of the oven are emitted, with each said laser beam being (a) emitted through an associated opening and any windows of the associated opening, (b) directed towards the mirror associated with that opening, and (c) redirected by the mirror towards the pump-out tube of the VIG unit subassembly at the corresponding level. The pump-out tubes are melted in making the VIG units.

In certain example embodiments, a laser tip-off system for a vacuum insulating glass (VIG) unit is provided. The system includes an oven; at least one laser source for melting a pump-out tube of the VIG unit; a vision system configured to provide positional data for facilitating the melting of the pump-out tube; a backlighting system located remote from the oven; and a quartz rod configured to convey light from the lighting system to an area proximate the pump-out tube and through VIG unit so as to increase contrast in that area and facilitate location of the pump-out tube by the vision system.

It will be appreciated that other, non-quartz materials may be used to convey the light from the external light source to an area "under" the VIG unit or to any other suitable area such that it functions as a backlight that helps aid the vision system. Such materials may be capable of surviving the high temperatures of the oven while also conveying a suitable amount of light for serving backlighting purposes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A laser tip-off system for a vacuum insulating glass (VIG) unit, comprising:
    an oven having an oven interior and a sidewall in which at least one opening is formed, at least one window being located in the at least one opening;
    at least one reflector located in the oven interior; and
    at least one laser source located outside of the oven, the at least one laser source being aligned with the window and configured to emit a laser beam towards the at least one reflector,
    wherein the at least one reflector is oriented within the oven interior to cause laser beams emitted from the at least one laser source to be redirected towards a pump-out tube of a VIG unit subassembly provided to the oven interior.

2. The system of claim 1, wherein the or each said opening includes at least first and second windows.

3. The system of claim 1, wherein each said window is made of quartz.

4. The system of claim 1, further comprising a series of rollers located in the oven, the rollers being suitable for conveying the VIG unit subassembly through the oven.

5. The system of claim 1, wherein the at least one laser source is repositionable to adjust an area on which laser beams emitted therefrom is focused.

6. The system of claim 5, further comprising an artificial vision system configured to (a) detect the placement of the VIG unit subassembly within the oven and (b) provide a signal to at least one processor of a control unit, the signal being interpreted by the at least one processor to determine whether a vertical adjustment of the at least one laser source is to be made to adjust the area on which the laser beam is to be focused in dependence on the detected placement.

7. The system of claim 1, wherein:
    the sidewall of the oven includes a plurality of openings, each said opening including at least one window located therein, the openings being spaced apart from one another;
    a plurality of reflectors are located in the oven interior, each said reflector being aligned with a corresponding opening and window; and
    a plurality of laser sources are locatable outside of each said window, each said laser source being configured to emit a laser beam at a corresponding reflector, the corresponding reflector being oriented to redirected the corresponding laser beam that comes into contact therewith towards a pump-out tube of a VIG unit subassembly provided to the oven interior at a corresponding level thereof.

8. The system of claim 7, wherein the laser sources are individually actuatable.

9. The system of claim 7, further comprising a plurality of doors located in the sidewall, each said door being provided to close off a corresponding opening in the sidewall.

10. The system of claim 1, further comprising a housing in which the at least one reflector is located, the housing extending through the at least one opening in the sidewall and into the interior of the oven, the housing supporting a first window aligned with the at least one laser source and a second window that is substantially perpendicular to the first window.

11. A kit, comprising:
at least one vacuum insulating glass (VIG) unit subassembly, the VIG unit subassembly including a glass pump-out tube to be sealed and a pump cup located over the pump-out tube; and
a laser tip-off system for sealing the pump-out tube of the VIG unit subassembly, the system comprising:
an oven having an oven interior and a wall in which at least one opening is formed, at least one window being located in the at least one opening;
at least one reflector located in the oven interior; and
at least one laser source located outside of the oven, the at least one laser source being aligned with the window and configured to emit a laser beam towards the at least one reflector,
wherein the at least one reflector is oriented within the oven interior to cause laser beams emitted from the at least one laser source to be redirected towards the pump-out tube of the VIG unit subassembly when the VIG unit subassembly is provided to the oven interior.

12. The kit of claim 11, wherein the laser tip-off system further comprises a housing in which the at least one reflector is located, the housing extending through the at least one opening in the sidewall and into the interior of the oven, the housing supporting a first window aligned with the at least one laser source and a second window that is substantially perpendicular to the first window.

13. A method of making a vacuum insulating glass (VIG) unit, the method comprising:
providing an oven having an oven interior and a sidewall in which an opening is formed, wherein a reflector is located in the oven interior and at least one window is located in the sidewall;
supplying a VIG unit subassembly to the oven, the VIG unit subassembly having a pump-out tube to be sealed;
emitting a laser beam from a laser source located outside of the oven, the laser beam being emitted through the at least one window and towards the reflector and being redirected by the reflector towards the pump-out tube to be sealed; and
melting the pump-out tube using the laser beam in making the VIG unit.

14. The method of claim 13, wherein the opening includes at least first and second quartz windows.

15. The method of claim 13, wherein the oven includes a plurality of rollers configured to convey the VIG unit subassembly therethrough.

16. The method of claim 13, further comprising vertically and/or horizontally repositioning the laser source to adjust an area on which the laser beam is focused.

17. The method of claim 13, further comprising:
detecting, via a vision system, the placement of the VIG unit subassembly within the oven; and
adjusting a position of the laser source based on the detected placement of the VIG unit subassembly to cause a corresponding adjustment in an area on which the laser beam is focused.

18. The method of claim 13, wherein a housing in which the at least one reflector is located is connected to the oven, the housing extending through the opening in the sidewall and into the interior of the oven, the housing supporting a first window aligned with the laser source and a second window that is substantially perpendicular to the first window, the laser beam being emitted through the first window, redirected by the reflector, and through second window in that order.

19. A method of making vacuum insulating glass (VIG) units, the method comprising:
providing an oven having an oven interior and a wall in which a plurality of openings are formed, each opening corresponding to a different level of the oven and each level being suitable to accommodate a respective VIG unit subassembly, wherein a laser-grade mirror is located in the oven interior at each said level and wherein at least one window is located in each said opening; and
supplying VIG unit subassemblies to the oven at different respective levels thereof, the VIG unit subassemblies each having a pump-out tube to be sealed;
emitting laser beams from laser sources located outside of the oven, each said laser beam being (a) emitted through an associated opening and any windows of the associated opening, (b) directed towards the mirror associated with that opening, and (c) redirected by the mirror towards the pump-out tube of the VIG unit subassembly at the corresponding level;
the pump-out tubes being melted in making the VIG units.

20. The method of claim 19, wherein the laser sources are individually actuatable.

21. The method of claim 19, wherein doors located in the wall of the oven are openable and closable to open and close associated openings in the wall when laser sources are and are not being used therethrough, respectively.

22. The method of claim 19, wherein the oven interior is heatable to a temperature of about 500 degrees C., while the laser sources remain at temperatures at or near ambient.

23. The method of claim 19, wherein the oven interior is heatable to a temperature of about 300 degrees C., while the laser sources remain at temperatures at or below 50 degrees C.

24. The method of claim 19, wherein each said level supports a housing in which a corresponding mirror is located, each said housing extending through the corresponding opening in the sidewall and into the interior of the oven, each said housing supporting a first window aligned with the corresponding laser source and a second window that is substantially perpendicular to the first window, the laser beam being emitted through the first window, redirected by the reflector, and through second window in that order.

* * * * *